United States Patent
Hollis

[15] 3,662,876
[45] May 16, 1972

[54] CONVEYOR SYSTEMS
[72] Inventor: John Gordon Hollis, Peterborough, England
[73] Assignee: The Newall Engineering Company Limited, Peterborough, England
[22] Filed: Sept. 1, 1970
[21] Appl. No.: 68,600

[30] Foreign Application Priority Data
Sept. 12, 1969 Great Britain......................45,095/69

[52] U.S. Cl..........................................................198/219
[51] Int. Cl.:......................................................B65g 25/04
[58] Field of Search ...........................198/19, 34, 218, 219

[56] References Cited

UNITED STATES PATENTS 3,500,992  3/1970  Tabor....................................198/219
3,552,543  1/1971  Manetta................................198/219

FOREIGN PATENTS OR APPLICATIONS 1,280,738  11/1968  Germany..............................198/219

Primary Examiner—Edward A. Sroka
Attorney—Watson, Cole, Grindle & Watson

[57] ABSTRACT

A conveyor system comprising a main frame defining a fixed path with a succession of stations each having receiving means for receiving and supporting articles conveyed, a movable frame having conveying elements pivotally mounted thereon for up and down movement, and means for reciprocating the movable frame so that each element is moved between a pair of stations. The operation is such that each element lifts an article from a station, moves to the second station of its pair carrying the article, lowers the article at the second station, and returns to the first station. Means may be provided for rendering inoperative at least some of the elements independently of the operation of the other elements.

4 Claims, 5 Drawing Figures

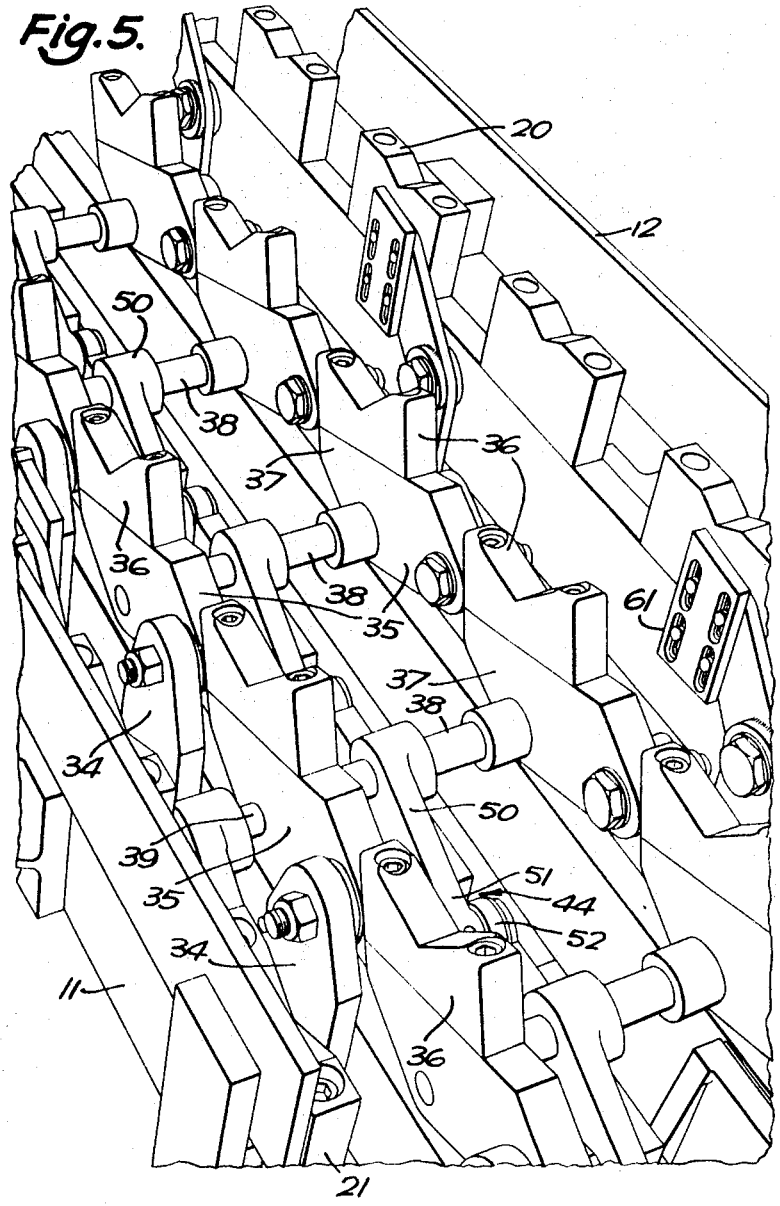

CONVEYOR SYSTEMS

The invention relates to conveyor systems.

The invention provides a conveyor system for conveying a succession of articles step-by-step to successive stations along a fixed path, comprising at each station, receiving means for receiving and supporting an article lowered onto the receiving means and also comprising a conveyor having a succession of conveying elements with means for simultaneously reciprocating the elements each between a pair of adjacent stations, and having means for raising each element when at the first station of its pair and for lowering the element when at the second station of the pair, the operation of the conveyor being such that each element when at its first station of its pair rises to lift an article off the receiving means at that station, then advances carrying the article to the second station of the pair where it descends to lower the article onto the receiving means at the second station, the element then returning to its first station into position to lift from the receiving means thereof an article deposited thereon by the preceding element in the succession.

At least some of the conveying elements may be rendered inoperative to convey an article, independently of the operation of the other conveying elements.

In the last described arrangement, there may be, at at least some of the stations, means for sensing the presence of an article at the station sensed, said means being operative when the presence of an article is sensed to render inoperative the conveying element which carries articles to that station.

The elements may consist of lever arms pivoted for up and down movement of the free ends thereof to a reciprocable bar extending lengthwise of the succession.

It is a feature of the invention that the arms each have a strut extending downwardly and rearwardly, considered in the direction of carrying of the articles, the lower end of the strut engaging in a notch in a second lengthwise reciprocable bar, and there is a lost-motion driving connection from the second bar to the first, whereby during the first part of the forward motion of the second bar, the notches advance relative to the first bar to move the struts to raise the elements, the two bars then move together during the remainder of the forward motion carrying the raised elements to their second stations, and during the first part of the return motion of the second bar the notches move relative to the first bar causing the struts to lower the elements and the two bars then return to their first position carrying the lowered elements to their first stations.

In the last described arrangement the struts may be pivotally attached to the elements and means may be provided for selectively raising the lower ends of the struts out of their notches whereby the strut so selected fails to raise the elements to which they are attached during the forward motion.

The strut raising means may be responsive to the presence of articles on the receiving means and may comprises for each receiving means a lever of which one end is depressed by an article on the receiving means and the other end engages and raises the strut of the element which carries articles to the receiving means.

The following is a description of one example of conveyor system constructed in accordance with the invention, reference being made to the accompanying drawings, in which:

FIG. 5 is a perspective view of part of the conveyor system shown in FIGS. 1 to 4.

Figure 1:
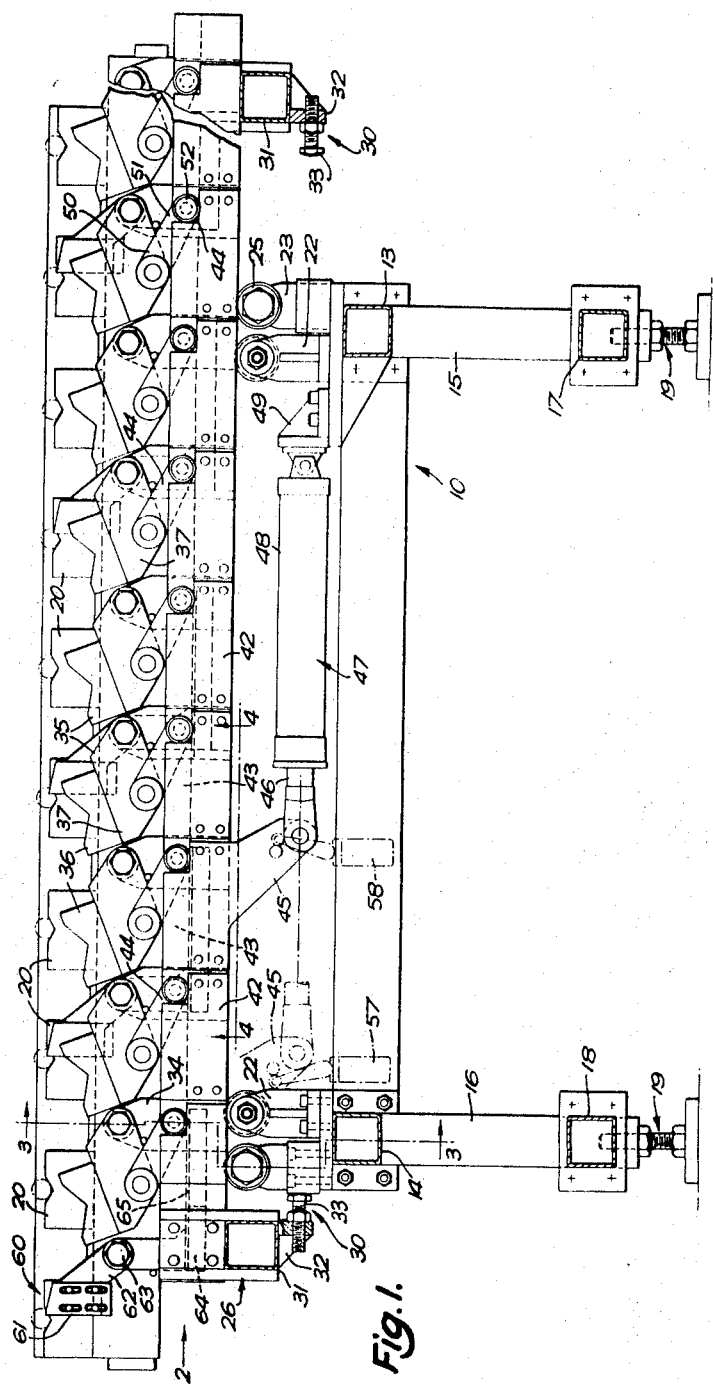
FIG. 1 is a sectional side view of a conveyor system.
Figure 2:
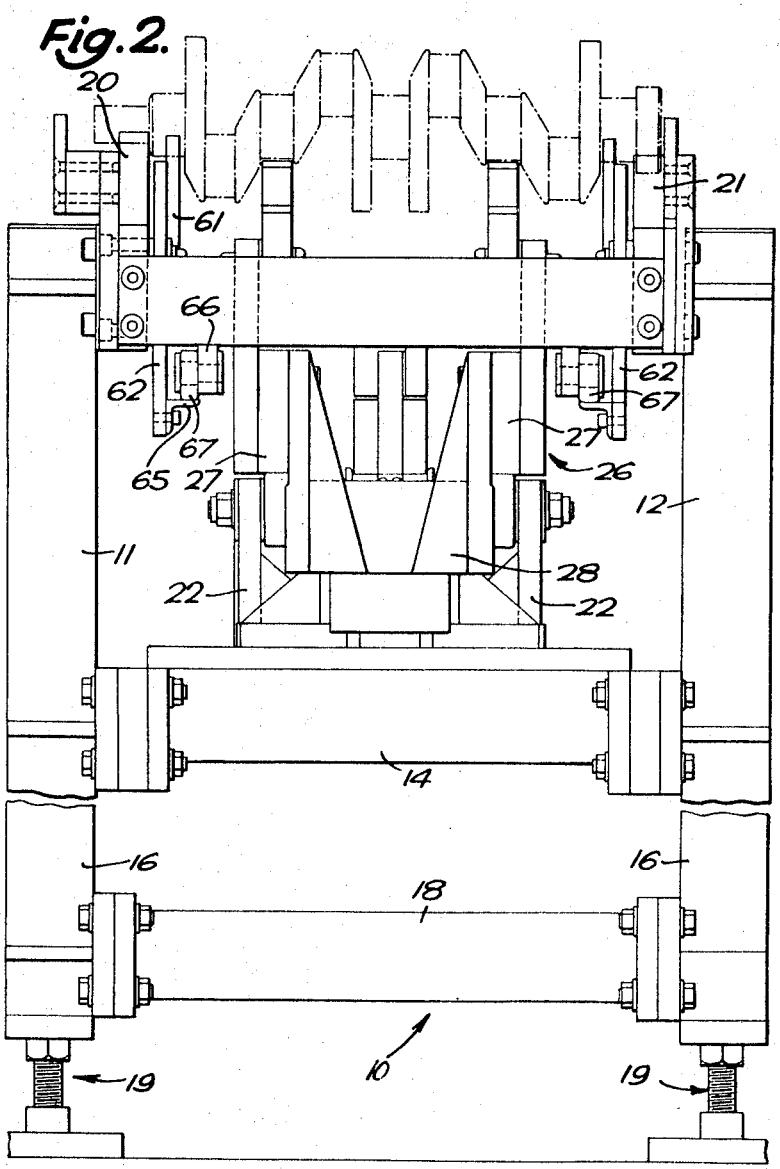
FIG. 2 is an end view on arrow 2 of FIG. 1.
Figure 3:
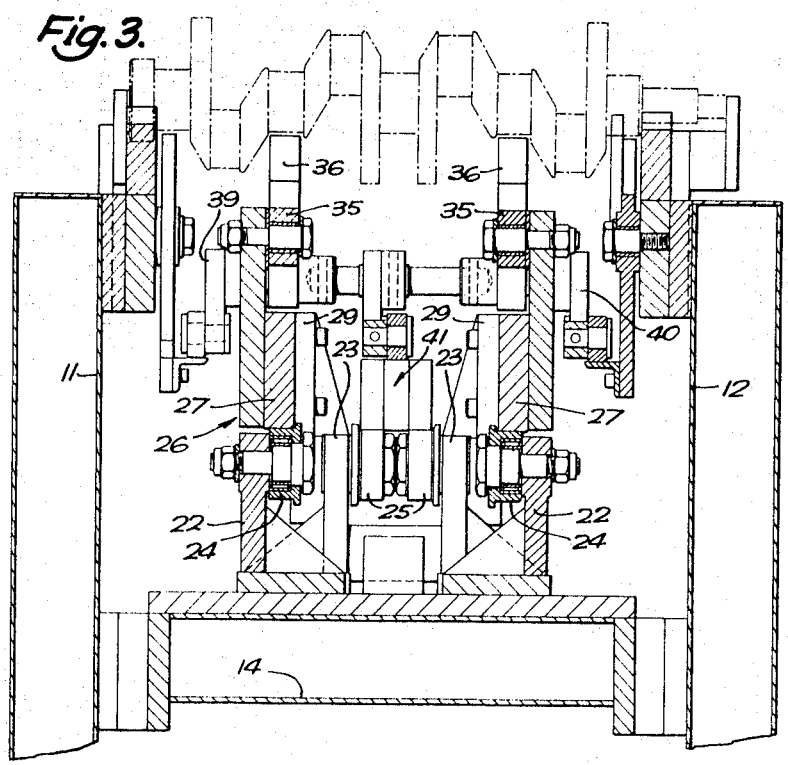
FIG. 3 is a sectional view on line 3—3 of FIG. 1.

A conveyor system constructed in accordance with the invention and being suitable for conveying elongated objects having ends of circular section, such as crankshafts, comprises a main frame 10 extending in the direction of the path along which articles are to be conveyed. The frame 10 comprises two side members 11 and 12, joined together by two cross members 13, 14. The frame 10 is supported on two pairs of legs 15, 16, joined together by further cross members 17, 18, each leg being provided with screw thread and nut height adjustment means 19.

Attached to the side members 11, 12 are opposed pairs of vee-blocks 20, 21 respectively, each pair spaced from the next by equal distances. Each pair of blocks 20,21 forms a station for receiving a conveyed article.

Secured to each cross members 13, 14 and displaced longitudinally are two pairs of upstanding pillars 22, 23. Flanged rollers 24,25 are rotatably mounted on each pair of pillars 22, 23 respectively, for rotation about a horizontal axis transverse to the length of the frame 10.

The pair of pillars 22 are spaced apart by a greater distance than the pair of pillars 23.

A movable frame 26, comprising elongated side members 27 held in spaced apart relationship by end pieces 28 and brackets 29, is located between the side members 11, 12 of frame 10. The side members 27 adjacent the cross members 13, 14 of frame 10 bear on the rollers 24 so that the movable frame 26 may be moved horizontally along the length of the frame 10.

The movable frame 26 is provided with end stops 30 at each end of the frame, which comprise box-sections 31 attached transversely to the underside of each end of the side members 27. Each box-section 31 carries a bracket 32, into which are threaded stops 33 which are adjustable in the direction in which the movable frame 26 is constrained to move. The stops 33 at each end of the frame 26 limit the movement in a horizontal direction of frame 26 by abutting extensions to the cross members 13 or 14 at the right hand or left hand extreme of movement respectively (as seen in FIG. 1).

The movable frame 26 is provided with a plurality of upstanding pillars 34 arranged in pairs, one pillar of each pair attached to one of the side members 27 respectively, the distance between each pair being equal to the distance between the pairs of vee-blocks 20, 21.

Each pillar 34 has an arm 35 pivotally mounted thereon, each arm being provided with a vee-block 36 secured to the end 37 of the arm remote from the pillar 34. Each pair of arms 35, pivotally mounted on a pair of pillars 34, are coupled together by a shaft 38 rotatably mounted in end 37 of the arms. The shaft 38 is located so that it projects outwardly from one of the arms of a pair, and lies flush with the other arm of that pair. The projecting part 39 of every alternate shaft 38 projects outwardly towards side member 11, the projecting part 40 of the remaining shafts 38 projects outwardly towards side member 12.

An actuating lever 41, comprising two elongated strips 42 secured one each side of a further strip 43, is located between the side members 27 of frame 26. Strip 43 is provided with slots (or notches) 44 at spaced intervals, the distance between each slot 44 being equal to the distance between the pairs of vee-blocks 20,21. The strips 42 are arranged to bear on rollers 25 so that the actuating lever 41 may be moved along the length of frame 10.

A downwardly extending plate 45 is secured to the actuating lever 41 part way between the cross members 12 and 13, on which is mounted the piston rod 46 of a double-acting hydraulic ram 47. The cylinder 48 of the ram 47 is mounted on a bracket 49 secured to cross members 13. Ducts (not shown) connect the ram 47 to a suitable source (not shown) of pressurized hydraulic fluid through reversing valves (not shown). Extension and contraction of the ram 47 causes the actuating lever 41 to move to the left and right respectively (FIG. 1).

Secured to each shaft 38, between each pair of arms 35, is a strut 50 extending towards the right hand (FIG. 1) end of the conveyor system. The end 51 of each strut 50 has a roller 52 rotatably mounted thereto, which rollers 52 may drop, under gravity, into slots 44.

Figure 4:
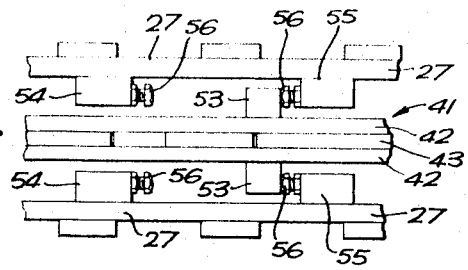
FIG. 4 is a part sectional view from the underside on line 4—4 of FIG. 1.

Two blocks 53 are attached, one each side, to strips 42 adjacent the plate 45, as best seen in FIG. 4. Further blocks 54, 55 are attached to the inside faces of side members 27 arranged in two spaced apart pairs, one pair disposed each side of blocks 53. The further blocks 54, 55 are provided with adjustable stops 56 against which the blocks 53 may engage as the actuating lever 41 is moved by the ram 47. The blocks 53 arranged between the stops 56 form a lost-motion mechanism between the actuating lever 41 and the frame 26.

At the commencement of a cycle of operation, the hydraulic ram is in the fully contracted position, the actuating lever 41 and movable frame 26 are in the relative positions shown in FIG. 4, and the rollers 52 of the struts 50 are in the respective slots 44. As the ram extends, the actuating lever 41 is moved towards the left, which causes the struts 50 to rotate the pairs of arms 35 in a clockwise direction, thus raising the vee-blocks 36. It will be appreciated that an article which was reacting on a pair of vee-blocks 20, 21 will be raised off that pair of vee-blocks and become supported by a pair of vee-blocks 36.

After a certain extension of the ram 47, the blocks 53 engage the stops 56 on blocks 54. Further extension of the ram moves both the actuating lever and the movable frame 26 to the left, so that an article on the vee-blocks 36 is carried to the left. The operation of the ram 47 is arranged so that when the vee-blocks 36 have been moved by the distance separating two pairs of vee-blocks 20, 21, the direction of movement of the ram is reversed and the ram contracts. The initial part of the contraction moves the actuating lever alone to the right, which causes the struts 50 to lower the vee-blocks 36 so that an article raised and carried by vee-blocks 36 is deposited on the pair of blocks 20, 21 next to the pair from which that article was raised. Further contraction of the ram 47 moves the actuating lever 41 so that blocks 53 engage the stops 56 on blocks 55, and draw the movable frame to the right until the ram is once more fully contracted. The conveying system is then ready to commence a further cycle. Stops 56 and 30 are adjusted so the vee-blocks 36 are correctly positioned adjacent pairs of vee-blocks 20, 21 at each extreme of stroke. The reversal of the ram 47 at each end of its stroke may be effected by limit switches (shown in broken lines 57, 58) engageable by a projection on plate 45 which control suitable valves (not shown) supplied by the source of pressurized hydraulic fluid.

Each pair of vee-blocks 20, 21 is provided with an accumulator device, which prevents an article being carried towards that pair of vee-blocks 20, 21 if there is already an article at that pair of vee-blocks.

Thus articles will be conveyed along the conveyor from one station to the station immediately ahead of the first station as described above, unless the station immediately ahead already has an article resting on the vee-blocks 20, 21. If articles are not being removed from the delivery end of the conveyor, the accumulator devices allow articles to accumulate one on each pair of vee-blocks 20, 21 back from the delivery end, until such time as articles are removed from the delivery end of the conveyor.

The accumulator devices for the pairs of vee-blocks 20, 21 are situated on alternate sides of the frame 10 adjacent the respective pair of vee-blocks 20, 21. The accumulator device will be described with respect to the pair of vee-blocks 20, 21 indicated at 60 (FIG. 1), although it will be appreciated a similar device is provided at each station.

The accumulator device comprises a plate 61 adjustably secured to a lever 62 which is pivotally mounted on a bolt 63 attached to the side member 11. Attached to end 64 of the lever 62 is an angle strip 65 which extends towards the right of the frame 10 (FIG. 1), and terminates adjacent the pair of pillars 34 supporting the arms 35 which feed station 60. The part 39 of the shaft 38 associated with the just mentioned arms 35 is arranged so that it projects beyond arm 35 towards the side member 11. Secured to the projecting part 39 is an accumulator link 66 having a roller 67 rotatably mounted at the end remote from the part 39.

The plate 61 is adjusted so that the upper corner 68 is situated within the vee of the block 20. The conveying system operates as described above until such time as an article has been received at station 60. The weight of the article bearing on the corner 68 of the plate 61 swings the lever 62 anticlockwise, thus raising the right hand end of the angle strip 65. The angle strip engages the roller 67 of the accumulator link 66, and rotates the link 66 and shaft 38 anti-clockwise when the movable frame moves to the right. The strut 50, being secured to the shaft 38 is also rotated in an anti-clockwise direction, and the roller 52 of strut 50 is raised out of the slot 44 in the actuating lever 41. The next cycle which the actuating lever 41 performs will not raise the arms 35 which feed the station 60 since the associated strut 50 is not in engagement with a slot 44.

When the article is removed from station 60, the roller 52 of strut 50 may drop into the slot 44, and on the next cycle the arms 35 and blocks 36 will be raised, and may feed station 60 with a further article.

Means may be provided to restrain movement of the frame 26 during the movement of the actuating lever 41 which raises and lowers the arms 35. For example, a further hydraulic ram (not shown) may be operatively connected to the frame 26, fluid pressure being supplied to the ram to oppose movement of the frame during the periods in which the arms 35 are being raised or lowered by ram 47.

I claim:

1. A conveying system for conveying a succession of articles in a step-by-step manner comprising a conveyor providing a fixed path, a succession of stations arranged along the fixed path, receiving means at each station for receiving and supporting an article lowered onto the receiving means, the conveyor comprising a succession of conveying elements arranged along the path, means for simultaneously reciprocating the elements each between a pair of adjacent stations, means for raising each element when at the first station of its pair and for lowering the element when at the second station of the pair, in which conveyor system the operation of the conveyor is such that each element when at its first station of its pair rises to lift an article off the receiving means at that station, then advances carrying the article to the second station of the pair where it descends to lower the article onto the receiving means at the second station, the element then returning to its first station into position to lift from the receiving means thereof an article deposited thereon by the preceding element in the succession, the said elements consisting of lever arms, and said reciprocating means comprising a reciprocable bar extending lengthwise of the succession to which the lever arms are pivoted for up and down movement of the free ends thereof, a lever strut extending downwardly and rearwardly, considered in the direction of carrying of the articles, being provided on each lever arm, and said system including a second lengthwise reciprocable bar having notches in which the lower ends of the struts are engageable, there being a lost-motion driving connection from the second bar to the first, whereby during the first part of the forward motion of the second bar, the notches advance relative to the first bar to move the struts to raise the elements, the two bars then move together during the remainder of the forward motion carrying the raised elements to their second stations, and during the first part of the return motion of the second bar the notches move relative to the first bar causing the struts to lower the elements and the two bars then return to their first position carrying the lowered elements to their first stations.

2. A system as claimed in claim 1, in which there is, at at least some of the stations, means for sensing the presence of an article at the station sensed, said means being operative when the presence of an article is sensed to render inoperative the conveying element which carries articles to that station.

3. A system as claimed in claim 2, in which the struts are pivotally attached to the elements and in which the sensing means are operative to selectively raise the lower ends of the struts out of their notches whereby the struts so selected fail to raise the elements to which they are attached during the forward motion.

4. A system as claimed in claim 3 in which the strut raising means are responsive to the presence of articles on the receiving means and comprise for each receiving means a lever of which one end is depressed by an article on the receiving means and the other end engages and raises the strut of the element which carries articles to the receiving means.

* * * * *